(12) United States Patent
Pandey

(10) Patent No.: US 9,497,497 B2
(45) Date of Patent: Nov. 15, 2016

(54) SUPPLEMENTAL CONTENT FOR A VIDEO PROGRAM

(71) Applicant: Verizon Patent and Licensing Inc., Basking Ridge, NJ (US)

(72) Inventor: Siddharth Pandey, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 145 days.

(21) Appl. No.: 14/069,029

(22) Filed: Oct. 31, 2013

(65) Prior Publication Data

US 2015/0121432 A1 Apr. 30, 2015

(51) Int. Cl.

| H04N 21/45 | (2011.01) |
|---|---|
| H04N 21/258 | (2011.01) |
| H04N 21/436 | (2011.01) |
| H04N 21/414 | (2011.01) |
| H04N 21/2668 | (2011.01) |
| H04N 21/81 | (2011.01) |
| H04N 21/475 | (2011.01) |
| H04N 21/4788 | (2011.01) |
| H04N 21/488 | (2011.01) |
| H04N 21/214 | (2011.01) |
| H04N 21/458 | (2011.01) |

(52) U.S. Cl.
CPC .... *H04N 21/25891* (2013.01); *H04N 21/2668* (2013.01); *H04N 21/41407* (2013.01); *H04N 21/43615* (2013.01); *H04N 21/4532* (2013.01); *H04N 21/4755* (2013.01); *H04N 21/4756* (2013.01); *H04N 21/4788* (2013.01); *H04N 21/4882* (2013.01); *H04N 21/8133* (2013.01); *H04N 21/2143* (2013.01); *H04N 21/458* (2013.01)

(58) Field of Classification Search
None
See application file for complete search history.

(56) References Cited

U.S. PATENT DOCUMENTS

| 5,973,683 | A | * | 10/1999 | Cragun et al. | 715/719 |
| 8,918,818 | B2 | * | 12/2014 | DeWeese et al. | 725/61 |
| 2001/0001160 | A1 | * | 5/2001 | Shoff | H04N 5/44543 725/51 |
| 2006/0117349 | A1 | * | 6/2006 | Ruhl | H04N 5/44543 725/46 |

\* cited by examiner

*Primary Examiner* — Cai Chen

(57) ABSTRACT

A method includes identifying a video service device that receives a video service. The video service includes video content provided by a video service provider, and the video service device is associated with a customer premises network. The method includes identifying a first video program displayed by the video service device. The method also includes identifying a personal device that accesses other content via another communication channel. The method includes identifying a user account associated with the personal device, identifying preferences associated with the user account, and determining cross channel content based on the video content, the first content and the preferences associated with the user account. The method includes integrating the cross channel content and the first content to form integrated content, and providing the integrated content at the personal device coordinated with the receipt of the first video program at the video service device.

20 Claims, 9 Drawing Sheets

| | 00:00 – 05:00 | 05:00 – 10:00 | 10:00 – 15:00 | 15:00 – 20:00 | 20:00 – 25:00 |
|---|---|---|---|---|---|
| FVP 602 | VIDEO PROGRAM SEGMENT 610-1 | VIDEO PROGRAM SEGMENT 610-2 | VIDEO PROGRAM SEGMENT 610-3 | VIDEO PROGRAM SEGMENT 610-4 | VIDEO PROGRAM SEGMENT 610-5 |
| COMM CONTENT 630 | COMMERCIAL CONTENT 630-1 | | | COMMERCIAL CONTENT 630-4 | |
| SOCIAL CONTENT 640 | | SOCIAL MEDIA 640-1 | SOCIAL MEDIA 640-2 | | SOCIAL MEDIA 640-4 |
| INTERNET 650 | | INTERNET CONTENT 650-1 | | | INTERNET CONTENT 650-2 |
| SUPP PROGRAM 660 | SUPPLEMENTAL PROGRAM 660-1 | SUPPLEMENTAL PROGRAM 660-2 | SUPPLEMENTAL PROGRAM 660-3 | SUPPLEMENTAL PROGRAM 660-4 | SUPPLEMENTAL PROGRAM 660-5 |
| PERSONAL CONTENT 670 | | PERSONAL NOTE 670-3 | PERSONAL NOTE 670-3 | PERSONAL NOTE 670-3 | |

SUPPLEMENTAL CONTENT FOR A VIDEO PROGRAM

BACKGROUND INFORMATION

Video service providers typically provide video content to users via displays associated with set top boxes that receive video programs from a network associated with the video service provider. The set top boxes may include tuners that receive audio visual feeds from a video service provider and digital video recorders (DVRs) that record the audio visual feeds. The video service providers may also provide additional services such as Internet, landline and wireless telephone services.

BRIEF DESCRIPTION OF THE DRAWINGS

FIG. 6 is an exemplary cross channel integration table consistent with embodiments described herein;

DETAILED DESCRIPTION OF PREFERRED EMBODIMENTS

Figure 1:
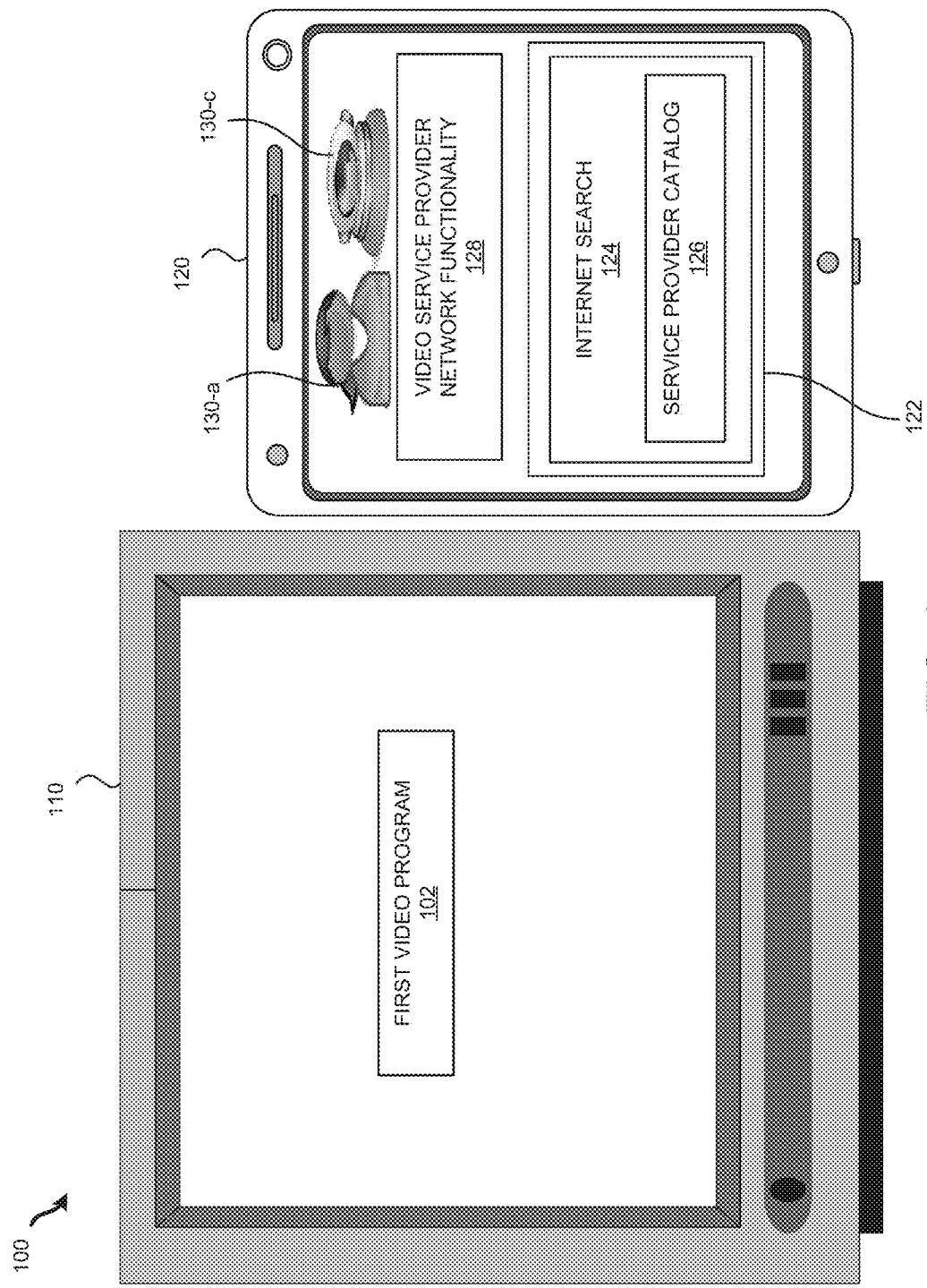
FIG. 1 illustrates concepts of supplementation of a first program received at a first device with second content provided at a second device consistent with embodiments described herein.

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein relate to devices, methods, and systems for providing an integrated viewing experience on a video service device (e.g., a household viewing device, such as a television connected to a set top box) that receives a video service from a video service provider and a secondary device (e.g., a personal device associated with a single user, such as a mobile device, tablet, etc.) that accesses other content from another content source via a second network (e.g., the Internet). The systems may provide a user experience in which access via one communication channel is linked to access via the second communication channel in a manner in which the user experience (e.g., viewing) on one device is integrated with the user experience (e.g. browsing) on another device as a coherent whole with content shared from sources associated with each of the devices to provide an enhanced viewing experience and direct access to the video service provider system via both devices. The systems may identify the video content (e.g., a catalog of video content) that may be included in the video service. The systems may also identify a first video program that is currently displayed by the video service device. The systems may determine cross channel (or cross service) content based on the video content, and the other content. The channel in the term cross channel content refers to different communication channels that may be simultaneously received by different devices, such as a cable service and Internet service. The systems may integrate the cross channel content and the other content at the personal device to form enhanced content, and provide the enhanced content at the personal device coordinated with the providing of the first video program at the video service device. The integrated content enables access via the personal device to content associated with the video service provider In implementations described herein, systems and methods may identify the first video program provided to the first device via a first network and provide cross channel supplemental information from at least one additional network on the second device. The information provided to the second device may be synchronized with the first program provided to the first device. For example, if a particular user is browsing the Internet for information related to video programs, the systems may determine whether the video programs are included in a catalog provided by the video service provider and incorporate the catalog into the browsing. The systems may provide a message on the second device that a particular movie that the user has indicated interest in is available from the video service provider and stored in a particular folder (e.g., a folder accessible via the first device named "New releases").

Consistent with the embodiments described herein, the systems and methods may enable the user to synchronize video service related information, such as contacts, movie catalogs etc., between different devices and platforms to make the video service related information available for applications such as presence, chat, location tagging status and social media updates.

FIG. 1 illustrates concepts described herein. More specifically, FIG. 1 shows a first video program 102 provided to a first device 110 via a first video service provider network (or system) and cross channel supplemental content 122 based on the first video program 102 provided at a second device 120. The systems may also provide video service provider network functionality 128 and allow electronic interaction with family members (represented by avatars in FIG. 1) 130 within the context of the video service provider network via second device 120.

Systems and methods may provide an integrated and expanded viewing experience for a video service provided by a video service provider via a video service provider network across multiple devices (e.g., first device 110 and second device 120). The video service provider may provide a first video program 102 at a first video service receiving device (or set of devices) 110, such as a set top box and television display. The viewing experience for the first video program 102 may be integrated into a particular user's online activity and household viewing activity using, for example, supplemental content provided at a second device 120.

Content accessed on either of the first device 110 (e.g., video content from the video service provider) or the second device 120 (e.g., content from networks external to the video service provider's system, such as the Internet) may be analyzed and used to determine content to be displayed at the other device. For example, if the user is viewing a first program at the first device 110, the first video program 102 may be analyzed (for instance as described herein below with respect to FIGS. 5 and 6) and cross channel supplemental content 122 may be identified and provided at the second device 120 based on the first program 102 provided at the first device 110. The second device 120 may include a personal device (e.g., a mobile device) associated with a particular user. The cross channel supplemental content 122 may include, for example, a second broadcast stream that supplements the first video program, social media content provided by user identified persons or groups or general Internet content 124 related to the first video program. The cross channel supplemental content 122 may include a streaming video program provided at the second device 120 that may be synchronized with the first video program 102 provided at the first device 110 on a frame by frame, or segment by segment basis, such as further described herein below with respect to FIG. 7. If the customer is watching the first video program 102 on the first device 110, the display on the second device 120 may provide details related to reviews, comments, ratings from the Interned in real-time while the first video program 102 is playing.

According to an embodiment, if a customer performs an Internet search 124 on second device 120 (or searches on any other network external to the video service provider system) or otherwise browses for information related to video programs provided by the video service provider, the systems may determine whether the video programs are included in a catalog provided by the video service provider and incorporate results from the service provider catalog 126 into the results of the Internet search 124 and the user's total browsing experience (e.g., by "pop up" recommendations, a tool bar, or other methods integrated into the browsing experience and allowed by the particular user). In other words, the request for supplemental content 122 may be generated based on the Internet browsing activity associated with second device 120. In one example, the second device 120 may receive a notification that a particular video program that the user has expressed interest in (e.g., by searching, discussing on social media, etc.) is available via the video service provider network and may be provided at the first device 110. The systems may integrate the supplemental content 122 into the content that the user is currently accessing on the second device 120 to form enhanced content (e.g., the supplemental content may be added to Internet search results). The systems may provide functionality related to the video service from the enhanced content. For example, the systems may direct the user to access the video program indicated in an Internet search in a particular folder provided by the video service provider system (e.g., by opening the folder named "New releases" at first device 110).

According to another embodiment, the systems and methods may provide video service provider network functionality 128, such as an ability to make changes to the video service or to place orders for changes to the service via the second device 120. If the customer orders an additional service or upgrade for the video service via the second device 120, the first device 110 may display an alert when the additional service is activated (for example, based on detected viewing activity at the first device 110). The systems may also provide an ability to receive messages or interaction from different persons related to the usage of the video service provider network. For example, as further described with respect to FIG. 8 herein below, the systems and methods may allow the user to view, interact with, and, in some instances, provide instructions or information to the video service provider system regarding other users (represented by avatars 130) within (or related to) a customer premises network.

Figure 2:
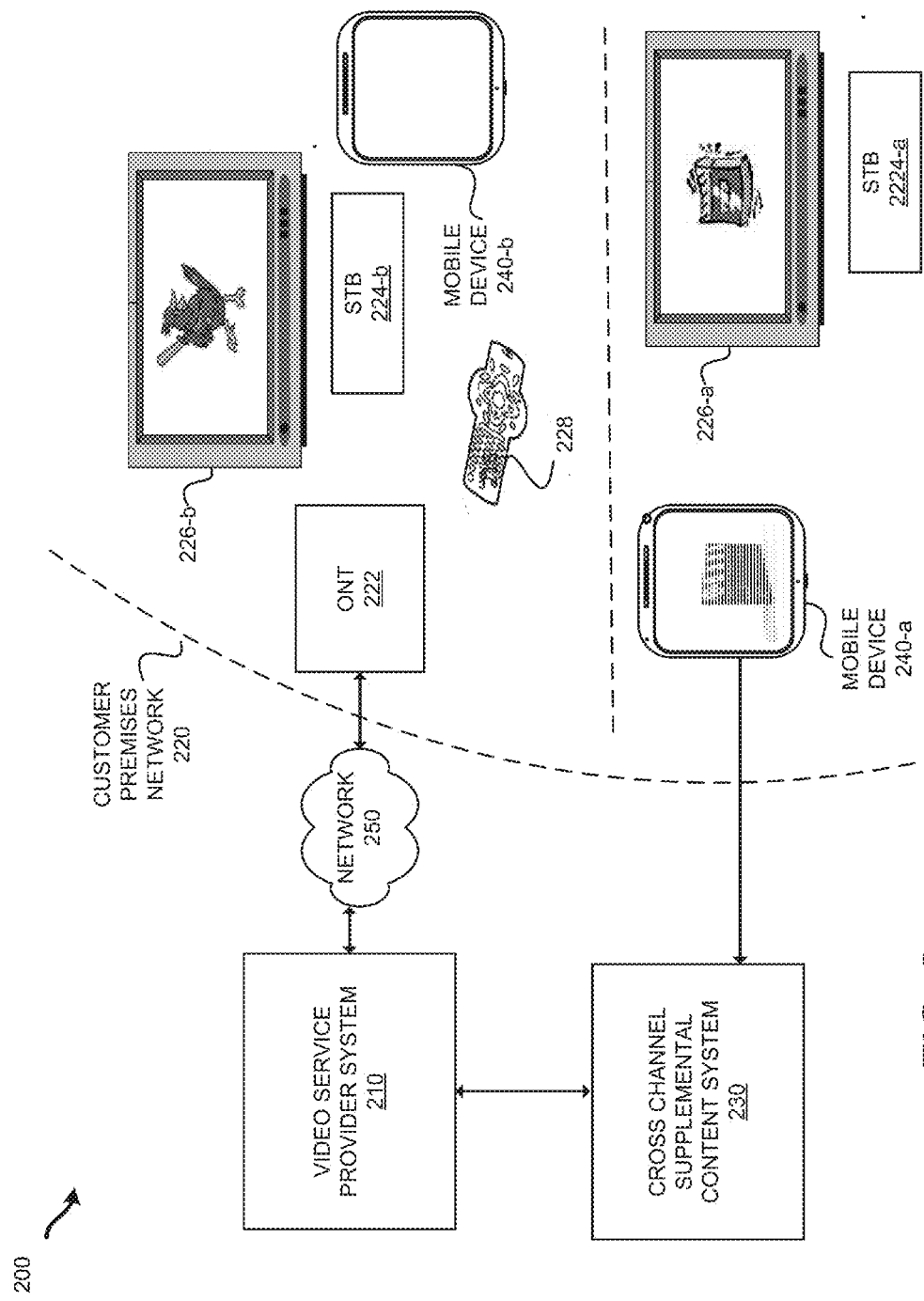
FIG. 2 illustrates an exemplary network in which systems and methods described herein may be implemented.

FIG. 2 is a diagram of an exemplary environment 200 in which systems and/or methods described herein may be implemented. As illustrated, environment 200 may include a content provider system 210, a customer premises network 220, a cross channel supplemental content system 230 and a plurality of personal devices 240 (shown as personal device 240-*a* to 240-*b*). Customer premises network 220 (e.g., the customer's home) may include an optical network terminal (ONT) 222, and different groupings of devices that receive and display video programs (e.g., set-top boxes (STBs) 224, TVs 226, and remote controls 228, shown, for example as a first group of STB 224-*a*, TV 226-*a* and remote control 228 and a second group of STB 224-*b* and TV 226-*b*). Video service provider system 210 and customer premises network 220 may be interconnected by network 250. Components of environment 200 may be interconnected via wired and/or wireless connections. The configuration of components of environment 200 illustrated in FIG. 2 is for illustrative purposes only. Other configurations may be implemented. Therefore, environment 200 may include additional, fewer and/or different components than those depicted in FIG. 2. Also, in some instances, one or more of the components of environment 200 may perform one or more functions described as being performed by another one or more of the components of environment 200.

Video service provider system 210 may collect, generate, and provide video content to subscribers/recipients of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Video service provider system 210 may provide media content to customer premises network 220. Additionally, video service provider system 210 may provide metadata associated with the media content. According to one embodiment, video service provider system 210 provides scheduled media content on a subscription and/or pay per view basis. Video service provider system 210 may provide the video programs (e.g., to customer premises network 220) based on input received via STBs 224.

Customer premises network 220 may include a subscriber home that receives video content from video service provider system 210. The customer premises network 220 may have an associated household video services account maintained by persons associated with the household with the video service provider that identifies services, terms, conditions, and parental controls, etc., for the video service provided to customer premises network 220.

ONT 222 may receive data, e.g., on a fiber optic cable, and may transfer the data to the appropriate devices in customer premises network 220, such as STBs 224-*a* and 224-*b*. Likewise, ONT 222 may receive data from any device in customer premises network 220 and may transmit the data to other devices in customer premises network 220, e.g., through a fiber optic cable. ONT 222 may provide customer premises network 220 with television access, Internet access, or telephone service, for example. Additionally, ONT 222 may output data to provider network 120 through network 250.

STBs 224 may receive video content and output the video content to TVs 226 for display. Each STB 224 may be connected to a single TV 226. STB 224 may include a component (e.g., a cable card or a software application) that plugs into a host device (e.g., a personal computer, TV 226, a stereo system, etc.) that allows the host device to display video content. STB 224 may also be implemented as a home theater personal computer (HTPC), an optical disk player (e.g., digital video disk (DVD) or Blu-Ray™ disc player), a cable card, etc. STB 224 may receive commands from other devices in network 100, such as remote control 228. In one embodiment, STB 224 may also include a microphone and/or a camera.

TV 226 may include speakers as well as a display. TV 226 may play content, for example, received from STB 224. While some embodiments described below may use TV 226 to view content, other embodiments may use any device (e.g., a computer or a mobile phone) to display/provide content.

Remote control 228 may issue commands for controlling other electronic devices, such as TV 226 or STB 224. Remote control 228, in conjunction with STB 224, may allow a user to interact with an application running on STB 224. In some instances, other types of devices (e.g., a keyboard, mouse, mobile phone, etc.) may be used instead of remote control 228.

Cross channel supplemental content system 230 may identify a first video program 102 that is currently displayed or which may be displayed at a first device, such as TV 226, via a video service provider network and related supplemental content 122 that is currently displayed or which may be displayed at a second device, such as personal device 240. Cross channel supplemental content system 230 may provide support linking the access, control and display of the first video program 102 at the first device to the access, control and display of the supplemental content 122 at the second device. Cross channel supplemental content system 230 may determine cross channel content based on content that the user is currently viewing on either of the first device 110 or second device 120. Cross channel supplemental content system 230 may integrate the cross channel content and the other content at the personal device to form enhanced content, and provide the enhanced content at the personal device coordinated with the providing of the first video program at the video service device. For example, cross channel supplemental content system 230 may receive an indication of a first video program 102 that is being viewed by a customer in customer premises network 220 at a first device or group of devices (e.g., STB 224 and TV 226) and provide cross channel supplemental content to personal devices 240 such as described herein below with respect to FIGS. 5, 6 and 7. Cross channel supplemental content system 230 may be implemented independently from video service provider system 210 or, alternatively, cross channel supplemental content system 230 may be integrated with video service provider system 210.

Personal device 240 may enable a user to view video content or interact with another personal device 240 or a video display device (e.g., STB 224 and/or TV 226). Personal device 240 may include, for example, a smartphone that may combine a cellular radiotelephone with data processing and data communications capabilities, a tablet computer, a laptop computer, a gaming console, or other types of computation or communication devices. In one implementation, personal device 240 may include a client-side application that enables personal device 240 to communicate with, for example, cross channel supplemental content system 230 and/or present information received from cross channel supplemental content system 230 to a user. Personal device 240 may be associated with a particular user (e.g., a parent in a household) for customer premises network 220 and may receive particular content and execute particular functionality based on the identification of the particular user (for example, parental control functions, such as described herein below with respect to FIG. 8).

Network 250 may include a wired or wireless network. Network 250 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 250 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 250 may also include a wireless satellite network.

Figure 3:
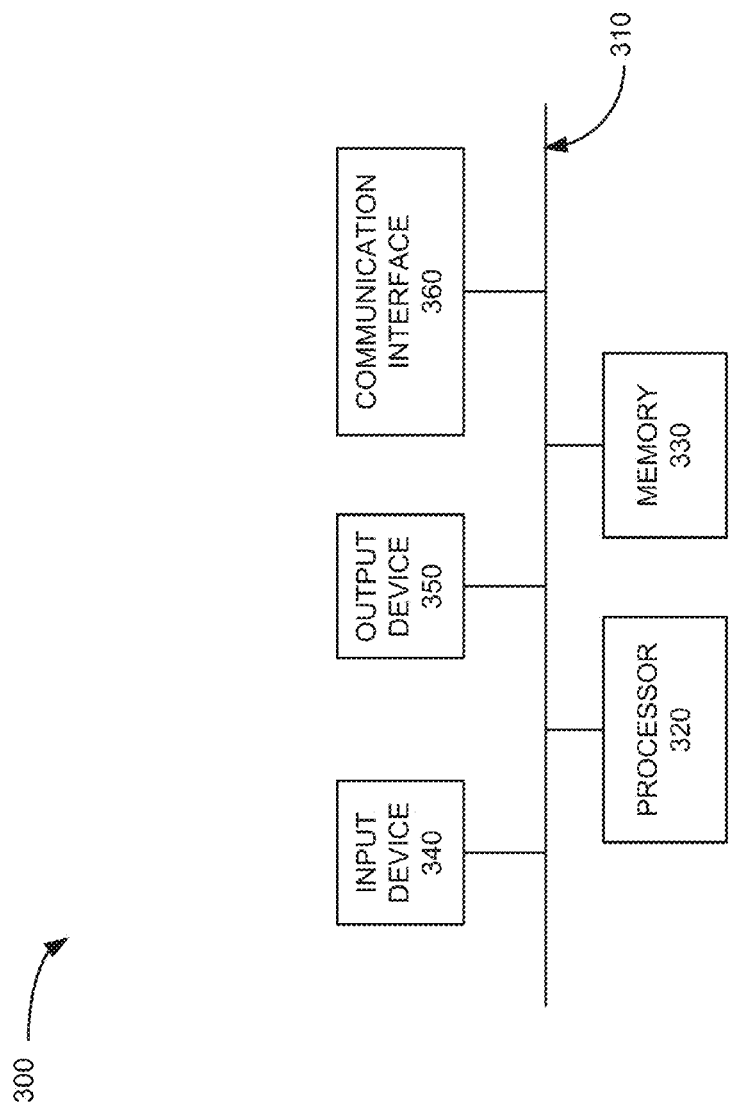
FIG. 3 is a block diagram of exemplary components of one or more of the devices of FIG. 2.

FIG. 3 is a diagram of exemplary components of a device 300. Each of video service provider system 210, ONT 222, STB 224, TV 226, remote control 228, cross channel supplemental content system 230 or personal device 240 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of environment 200.

As described herein, device 300 may perform certain operations in response to processing unit 320 executing machine-readable instructions contained in a computer-readable medium, such as memory 330. A computer-readable medium may include a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processor 320 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 4:
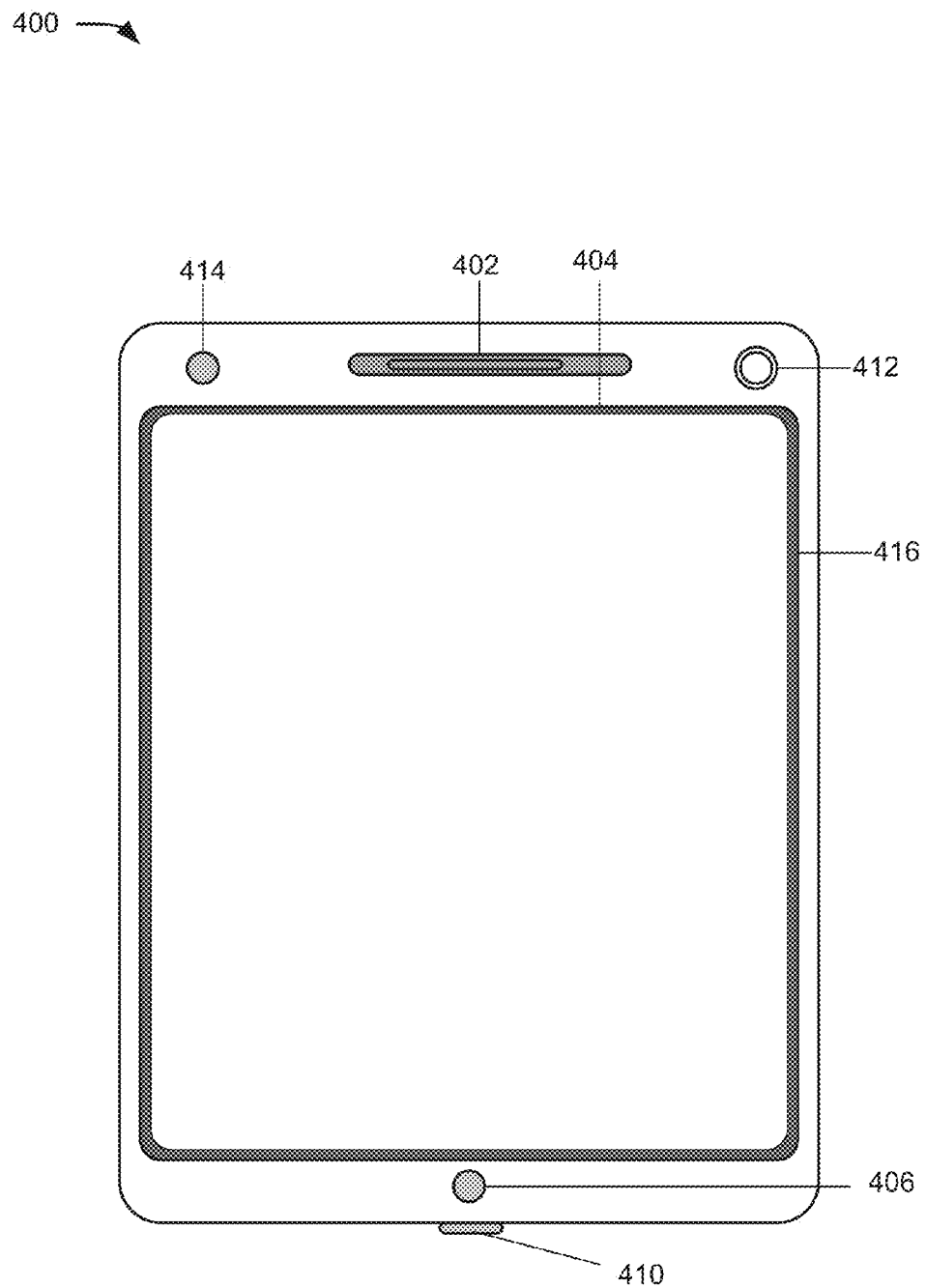
FIG. 4 is a diagram of an exemplary display device in which methods and systems described herein may be implemented.

FIG. 4 is a diagram of an exemplary device 400 in which methods and systems described herein may be implemented. For example, personal device 240 may include device 400. Although illustrated as a tablet or touch screen device, device 400 may include any of the following devices: a cellular phone, an electronic notepad, a tablet computer, a laptop, and/or a personal computer; a gaming device or console; or another type of computational or communication device.

In this implementation, device 400 may take the form of a tablet computer. As shown in FIG. 4, device 400 may include a speaker 402, a touchscreen display 404, control button 406, a microphone 410, sensors 412, a front camera 414, and a housing 316. Speaker 402 may provide audible information to a user of device 400.

Display 404 may provide visual information to the user, such as an electronic program guide, video images, or pictures. In addition, display 404 may include a touchscreen for providing input to device 400.

Control button 406 may permit the user to interact with device 400 to cause device 400 to perform one or more operations, such as place or receive a telephone call, input data to device 400, manipulate user interface elements, etc. Microphone 410 may receive audible information from the user. Sensors 412 may collect and provide, to device 400, information (e.g., acoustic, infrared, etc.) that is used to aid the user in capturing images or in providing other types of information. Front camera 414 may enable a user to view, capture and store images (e.g., pictures, video clips) of a subject in front of device 400. Housing 316 may provide a casing for components of device 400 and may protect the components from outside elements.

Figure 5:
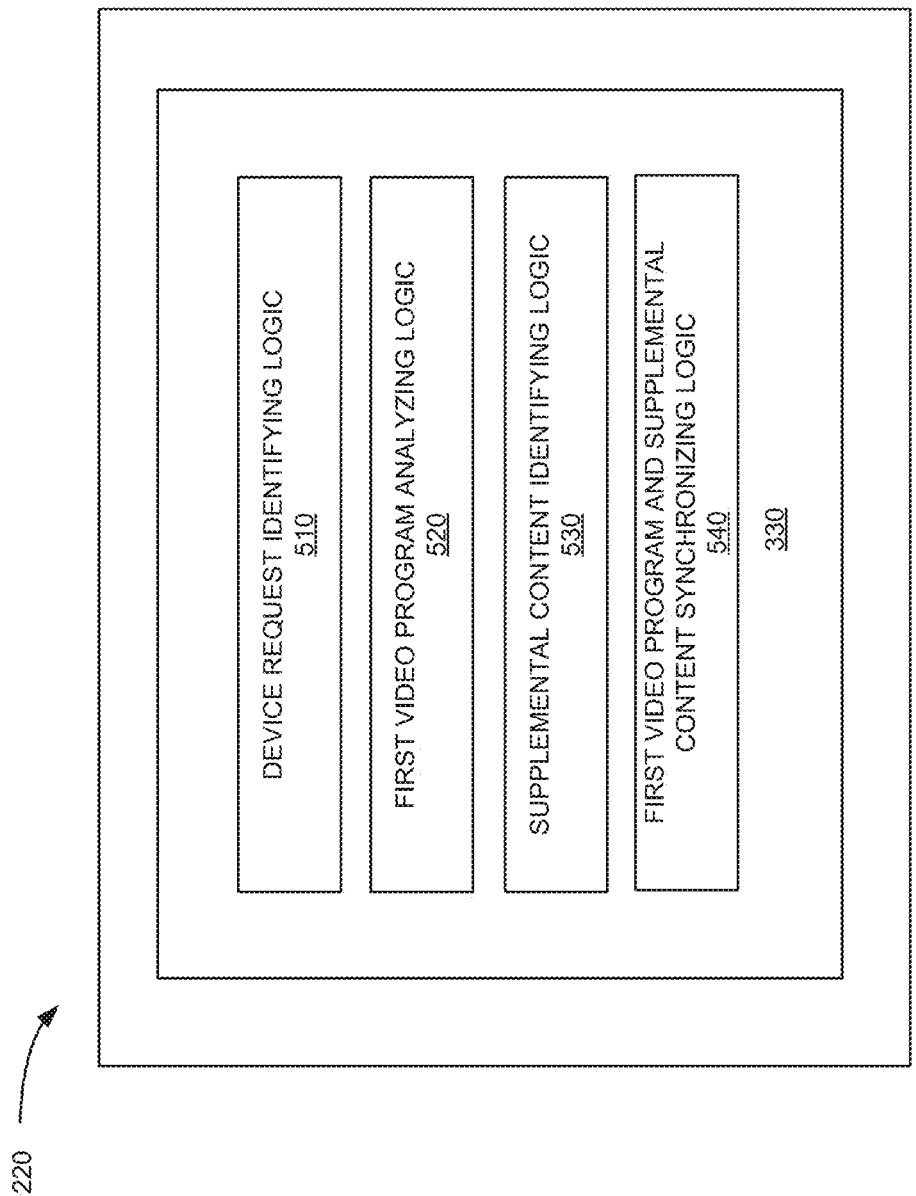
FIG. 5 is a functional block diagram of components of the cross channel integration management system of FIG. 2.

FIG. 5 is an exemplary functional block diagram of components implemented in cross channel supplemental content system 230. In an exemplary implementation, all or some of the components illustrated in FIG. 5 may be stored in memory 330. For example, referring to FIG. 5, memory 330 may include device request identifying logic 510, first video program analyzing logic 520, supplemental content identifying logic 530, and first video program and supplemental content synchronizing (FVPSCS) logic 540. In addition, various logic components illustrated in FIG. 5 may be implemented by processor 320 executing one or more programs stored in memory 330.

Device request identifying logic 510 may receive a request to complete a pairing of supplemental content at a personal device 240 with a first video program that may be received at a video service receiving device, such as STB 224 and TV 226. The request may be automatically generated when the user activates an application that creates or identifies an association between personal device 110 and second device 120. The application may also identify the communication channels and content sources associated with each of the first device 110 (e.g., a video catalog) and the second device 120. For example, device request identifying logic 510 may for supplemental content from a personal device 240 associated with a particular user in a home network, such as customer premises network 220 described above with respect to FIG. 2. Device request identifying logic 510 may identify the personal device 240 that requests supplemental content for the first video program displayed at the video service receiving device. For example, device request identifying logic 510 may receive an indication that personal device 240 is associated with a particular customer premises network 220 (e.g., the customer's personal device user account (e.g., for a mobile device) may be linked with a household video service account for the customer premises network 220 (or the personal device user account and the household video service account may be a same account).

Device request identifying logic 510 may also receive an indication of a first video program that is currently being displayed at a first device. Alternatively, or additionally, device request identifying logic 510 may receive an indication of a particular second device (e.g., personal device 240-a, in FIG. 2) associated with the household video service account that provides the request for supplemental content. For example, personal device 240 may identify the first device based on a signal transmitted from near field communication.

First video program analyzing logic 520 may analyze the first video program to determine elements of the first video program. For example, first video program analyzing logic 520 may determine particular elements in the first video program on a frame by frame or segment by segment basis. First video program analyzing logic 520 may analyze the first video program based on metadata associated with the video program, social media that is tagged to or associated with the first video program (e.g., a time based social media posting that is associated with an appearance of a particular element at a particular time in the first video program), visual analysis of the elements in each picture of the video program, etc. First video program analyzing logic 520 may analyze the first video program to identify persons, themes, places, music, or nay definable interest that may be included in or associated with a particular section of the first video program. First video program analyzing logic 520 may determine times in the video program that the identified elements occur.

Supplemental content identifying logic 530 may identify supplemental content based on the identified elements of the first video program. For example, supplemental content identifying logic 530 may identify supplemental content 122 based on particular online discussions, articles, actors in the first video program, commercial concerns associated with the elements in the first video program (e.g., a price of a particular piece of clothing in a movie and a related link to a website that sells the clothing), recommended content that is associated with the elements in the first video program, statistics, descriptions (e.g., a location description), etc. In some implementations, supplemental content identifying logic 530 may identify a database external to video service provider system 210 and provide pointers to the identified supplemental content (e.g., Uniform Resource Locators (URLs)). Supplemental content identifying logic 530 may also identify the supplemental content 122 based on preferences associated with the user. For example, a user may select to receive supplemental content based on clothing worn by actors in the first video program. In a further example, the user may select to receive supplemental content based on the gender of the actors (e.g., shopping information, such as prices and outlets for female clothing only).

FVPSCS logic 540 may synchronize first video program and supplemental content. For example, FVPSCS logic 540 may determine times at which particular elements occur in the first video program. FVPSCS logic 540 may determine supplemental content that matches the particular elements in the first video content and cue the supplemental content to be played on the second device at a same time that the particular elements appear in the playback of the first video program.

FIG. 6 is an exemplary diagram representing an exemplary cross channel integration table 600. Cross channel integration table 600 represents integration information for a particular video program and related supplemental content which may be stored or accessed by cross channel supplemental content system 230 during the course of providing supplemental content on a second device in an integrated manner with the receipt of the particular video program at a first device. As shown in FIG. 6, cross channel integration table 600 may include a first video program (FVP 610) that includes video program segments (610-1 to 610-5) and pointers to supplemental content that may be stored in association with the different video program segments 610-1 to 610-5, such as commercial content 630, social content 640, Internet content 650 and supplemental programs 660.

The pointers to the supplemental content may be stored with descriptions of device requirements and routing protocols that may be needed in order to access and display the supplemental content. For example, the pointers to the supplemental content may be stored along with information that identifies required streaming capabilities for video included in the supplemental content. The additional information may be provided to requesting devices based on a particular type of requesting device.

Commercial content 630 (shown as commercial content 630-1, 630-4) may include advertisements, purchase information, etc., that may be provided at the second device in association with a particular element in the particular video program currently being displayed at the first device. For example, an advertisement for a song at an online record store may be provided at the second device in conjunction with display (or playing of the music) of the song at the first device.

Social content 640 (shown as social media 640-1, 640-2 and 640-4) may include social media content that is provided in association with particular times and or elements in the particular video program. For example, the social media may include postings by identified social media "friends" or colleagues regarding particular scenes of a movie or documentary. The user may synchronize contacts from different devices, websites, social media platforms, etc., to allow the user to control the pairing of social media with particular video programs. The user may also synchronize social media applications to different devices associated with the user, including the personal device. The user may also synchronize movie catalogs associated with the video service provider to the personal device.

Internet content 650 (shown as Internet content 650-1 and 650-2) may include information gathered from a general Internet search based on particular elements included in a particular segment 610. Additionally, or alternately, the Internet content 650 may include information from particular Internet accessible databases. For example, the Internet content may include statistics that describe a particular element, website information, etc.

Supplemental program 660 (shown as supplemental program 660-1 to 660-5) may include a program that supplements or complements the first video program. For example, the supplemental program may include a second video program that includes, for example, ongoing commentary (e.g., from a director, actor, etc.) regarding a motion picture that describes the motion picture. In other implementations supplemental program 660 may include an alternate audio feed that describes events included in the first video program. For example, the first video program may be a sporting event and the supplemental program may include a radio broadcast that covers the same sporting event. The first video program 102 and the supplemental program may be synchronized.

Personal content 670 (shown as personal note 670-1 to 670-3) may include notes provided by the user to describe the video content. Personalized action—saving—bookmarking, annotating. For example, the personal content may include links to text, audio and/or video provided by the user. In some implementations, the personal content may be output to a social media site. Pass real time status information to mobile app—currently playing Cars. In some implementations, the personal content may be stored securely on the second device.

The supplemental content may be provided to the second device based on time cues for the appearance of particular elements in the particular video program displayed at the first device.

Figure 7:
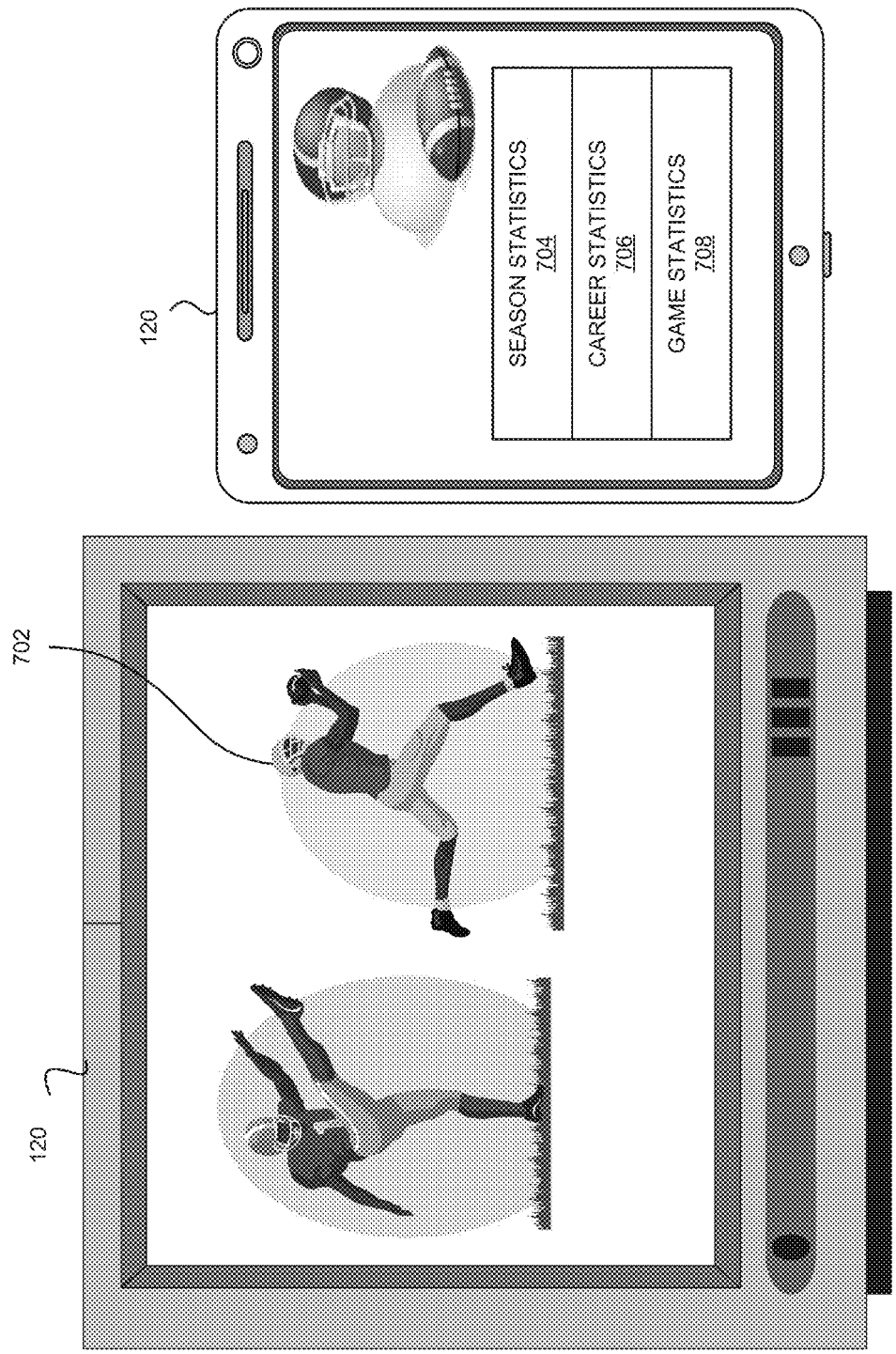
FIG. 7 is an exemplary first user interface including a first video program and a second user interface including second content based on the first video program.

FIG. 7 is an exemplary user display diagram 700 representing concurrent display of a first video program at a user interface for a first device (e.g., on a display TV 226 associated with STB 224) with display of supplemental information at a second device (e.g., on personal device 240).

As shown in FIG. 7, the first device may display first video program 102 that may include particular persons, such as, in this instance, an athlete 702 in a sporting event. In other embodiments first video program 102 may include a movie, a television series, a music video, etc. The second device may provide supplemental content that describes or enhances aspects that are currently displayed or represented in the primary content, such as, in this instance, statistics that describes a particular person (i.e., a player) currently displayed in the sporting event. In this particular example, the system may have gathered different statistics (e.g., from a secondary source such as a sports website or application) based on a particular input provided by the user and may display these statistics dynamically when particular events are identified in the first video program (e.g., season statistics 704, career statistics 706 and/or game statics 708 of the athlete 702 in response to the athlete performing particular acts in the first video program 102 (e.g., making a first down, scoring a touchdown, etc.). In other embodiments the supplemental content may include an actor biography, behind the scenes footage, lyrics to a song currently playing, running commentary describing the scene, etc.

Figure 8:
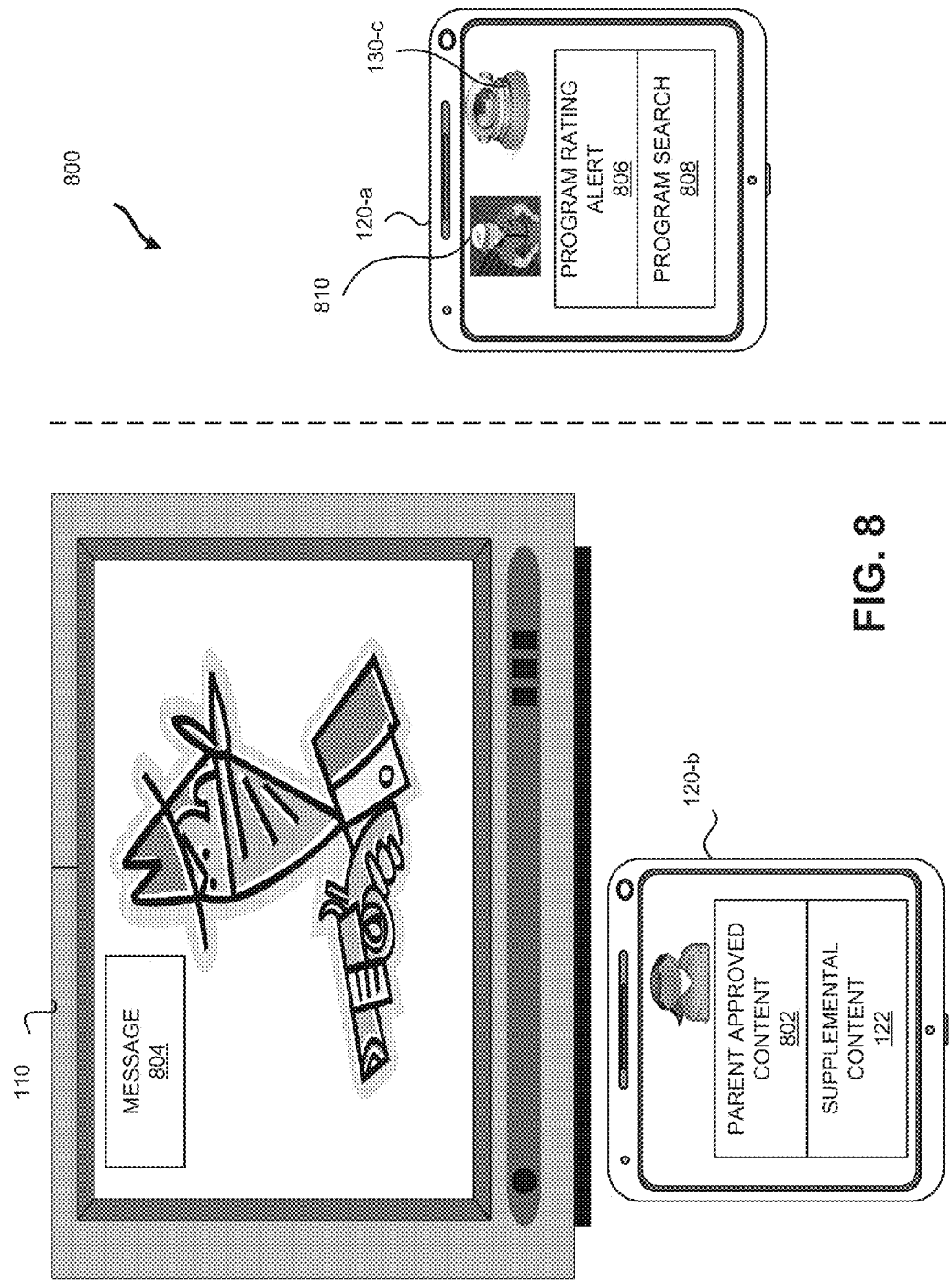
FIG. 8 is an exemplary first user interface and multiple second user interfaces associated with particular users in a parent network.

FIG. 8 is an exemplary user display diagram 800 representing a user interface presented on a display associated with STB 224 concurrently with user interfaces for a second device 120-a (i.e., a personal device 240 that is registered to the parent) associated with a parent in a customer premises network 220 and another device 120-b associated with a child (i.e., a personal device 240 that is registered to the child).

As shown in FIG. 8, the child may be viewing a first video program 102 at first device 110. The child may receive messaging 804 at first device 110 from the parent (e.g., input via the parent's device 120-a). Alternatively, the child may receive the message at the child's device 120-a. The message may include parent approved content 802 that may be displayed at the child's device 120-a (e.g., pay per view content). The child's device 120-a may also receive supplemental content 122 that is synchronized with the first program displayed at first device 110.

The parent may apply parental controls to content viewed by the child by entering instructions at second device 120-a.

For example, the parent may receive notifications of program rating alert 806 of a video program that the child is currently viewing (e.g., for a video program that has a parental guidance (PG rating) at second device 120-*b* and be located at a separate location (e.g., outside of the customer premises network 220). The parent may impose controls on the video program based on information provided that describes the program (e.g., reviews, synced social media descriptions from other parents). In this manner the parent may be able to "keep tabs" or monitor the child's viewing activity. In instances in which the video program is objectionable, the parent may perform a program search 808 for acceptable content provided by the service provider and provide the results to the child as parent approved content 802.

In another implementation, the parent may order changes to the video service (e.g., upgrades to a movie package) or technical help by communicating with support personnel 810 for the video service provider. The system may send customer service information to a current device that the parent is currently using based on information provided (with the user's approval) to the video service provider. In one example, a support system for the video service provider may select among a family of devices (e.g., first device 110, second device 120-*a*, etc.) to find the best way to notify the customer regarding order status or trouble shooting status. The system may also provide real time messaging for technicians arriving at the customer premises network 220.

Figure 9:
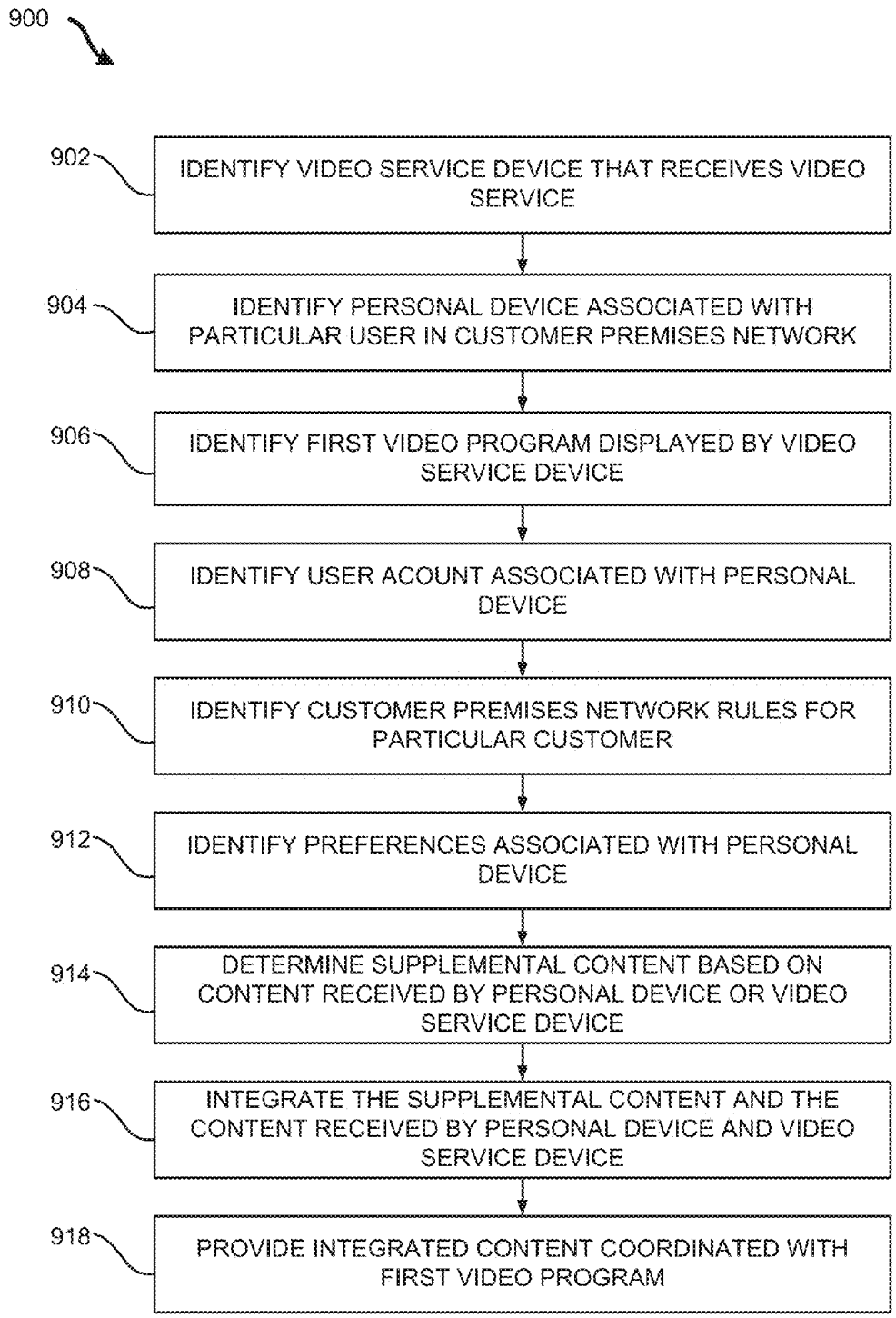
FIG. 9 is a flowchart of an exemplary process for providing an integrated viewing experience with a first video program on a first device via a first network and cross channel supplemental information on a second device according to an implementation described herein.

FIG. 9 is a flowchart of an exemplary process 900 for providing an integrated viewing experience with a first video program on a first device via a first network and cross channel supplemental information (and/or functionality) on a second device. Process 900 may execute in a device, for instance cross channel supplemental content system 230. In another implementation, some or all of process 900 may be performed by another device or group of devices, including or excluding cross channel supplemental content system 230. It should be apparent that the process discussed below with respect to FIG. 9 represents a generalized illustration and that other elements may be added to or existing elements may be removed from, modified or rearranged in process 900.

At block 902, cross channel supplemental content system 230 may identify a first device associated with customer premises network 220. For example, cross channel supplemental content system 230 may identify a TV 226 that displays the first video program 102.

Cross channel supplemental content system 230 may identify a personal device that accesses other content via another communications channel (block 904). For example, cross channel supplemental content system 230 may receive a request for supplemental content. The request for supplemental content may be a "standing" request, which is provided whenever the customer opens a particular application on a second device while viewing a first video program 102 at the first device. Alternatively, the customer may affirmatively make a one-time request for supplemental content.

Cross channel supplemental content system 230 may identify a first video program 102 that is currently displayed at the first device 110 (block 906). For example, cross channel supplemental content system 230 may communicate with the video service provider system 210 to determine a video program that is currently being streamed to the customer premises network 220. Alternatively, cross channel supplemental content system 230 may receive an identification of the first video program 220 from the customer premises network 220 or the second device (e.g., personal device 240-*a* in FIG. 2).

At block 908, cross channel supplemental content system 230 may identify a user account associated with the second device. For example, cross channel supplemental content system 230 may receive an identifier from the second device. The identifier may allow cross channel supplemental content system 230 to determine a particular user associated with the second device and preferences associated with the user.

At block 910, cross channel supplemental content system 230 may identify customer premises network rules for the particular customer. The customer premises network rules may include parental controls that are to be applied to viewing of video content. For example, cross channel supplemental content system 230 may identify a household video service account associated with the first device and communicate with a profile server (not shown) in video service provider system 210 to determine overall preferences/rules for the customer premises network 220. Customer premises network rules may provide general rules for all devices in the customer premises network 220. Cross channel supplemental content system 230 may also receive information identifying parental controls for particular devices in customer premises network 220.

At block 912, cross channel supplemental content system 230 may identify preferences associated with the second device. For example, cross channel supplemental content system 230 may access stored preferences for a user account that is associated with the second device. The stored preferences may include types of supplemental content to be displayed (e.g., video programs, shopping content, biographical data, etc.), sources of the cross channel content (e.g., particular social media persons, websites, databases, retailers, etc.) and a manner and priority order in which the supplemental content is to be displayed.

At block 914, cross channel supplemental content system 230 may determine cross channel content based on the content received by the user at either the first device 110 (i.e., the video service device) or the second device 120 (i.e., the personal device). For example, cross channel supplemental content system 230 may determine supplemental content 122 based on the first video program 102 and preferences associated with the second device. For example, cross channel supplemental content system 230 may search for supplemental content from sources that may be accessed by the second device 120 based on elements in each portion of the first video program 102. Cross channel supplemental content system 230 may search based on preferences input by the user. In some implementations, cross channel supplemental content system 230 may also determine the supplemental content based on customer premises network rules (such as parental controls) for the particular customer.

Cross channel supplemental content system 230 may integrate the cross channel content and the content received by the personal device 110 and/or video service device 120 (block 916) to form integrated content. For example, synchronize the supplemental content with the first video program. Cross channel supplemental content system 230 may identify times at which particular elements occur in the first video program and cue (i.e., position for playback) the corresponding supplemental content to be played at the second device at a same time that the particular elements of the first video program are displayed at the first device. In another example, cross channel supplemental content system 230 may identify a format and placement of supplemental results and pointers from a search of a video catalog associated with the video service that has been added to an Internet search or otherwise integrated into browsing activity of a user.

Cross channel supplemental content system 230 may provide cross channel content (or integrated content) to the second device coordinated with the providing of video programs to the first device. The video content at the first device 110 and the supplemental content 122 may be provided as an integrated whole across both the first device 110 and the second device 120. For example, cross channel supplemental content system 230 may provide the supplemental content 122 to the second device 120 synchronized with receipt of the first video program at the first device (block 918). In another example, cross channel supplemental content system 230 may allow the user to control both the supplemental content and the first video program simultaneously (e.g., the user may play, rewind or fast forward both to maintain the synchronization) based on input provided to one or other of the first device 110 or second device 120. Alternatively, cross channel supplemental content system 230 may allow the user to disrupt the synchronization and restore the synchronization between the supplemental content and the first video program based on instructions received from the second device.

Systems and/or methods described herein may provide machine guided manual DVR conflict resolution. The system may determine conflict status identifiers based on alternative recording opportunities for conflicting video programs.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   identifying a video service device that receives a video service, wherein the video service includes video content provided by a video service provider and the video service device is associated with a customer premises network;
   identifying a first video program displayed by the video service device;
   identifying a personal device that accesses other content from another network via another communication channel, wherein the personal device is a separate device from the video service device and the other content includes content provided externally from the video content provided by the video service;
   identifying a user account associated with the personal device;
   identifying preferences for receipt of cross channel content associated with the user account, wherein the cross channel content is based on the video content from the customer premises network and the other content from the other communication channel and wherein the cross channel content is provided from the video service to the personal device;
   determining the cross channel content based on analysis of elements of the first video program received at the video service device, the other content, and the preferences associated with the user account;
   integrating delivery of the cross channel content at the personal device and the first video program at the video service device to form integrated content; and
   providing the integrated content as an integrated whole across the personal device coordinated with the video service device, wherein the personal device and the video service device simultaneously receive portions of the integrated whole.

2. The computer-implemented method of claim 1, further comprising:
   identifying the cross channel content based on Internet browsing activity associated with the personal device.

3. The computer-implemented method of claim 1, wherein providing the integrated content further comprises:
   providing at least one of reviews, comments or ratings associated with the first video program.

4. The computer-implemented method of claim 1, wherein providing the integrated content further comprises:
   providing, at the personal device, at least one of an audio program or a second video program that is associated with the first video program.

5. The computer-implemented method of claim 1, further comprising:
   identifying an element currently displayed in the first video program at the video service device; and synchronizing the cross channel content at the personal device with the first video program based on the element in the first video program.

6. The computer-implemented method of claim 1, further comprising:
receiving a request for a change to the video service;
identifying at least one device from the personal device or the video service device that a user associated with the user account is currently using; and
providing a message regarding a response to the request for the change to the video service to the at least one device that the user is currently using.

7. The computer-implemented method of claim 1, further comprising:
synchronizing social media applications to the personal device based on at least one timing element associated with the first video program.

8. The computer-implemented method of claim 1, further comprising:
synchronizing movie catalogs to the personal device.

9. The computer-implemented method of claim 1, further comprising:
identifying a household video service account associated with the video service device;
identifying customer premises network rules for the video service device based on the household video service account; and
determining the cross channel content based on the customer premises network rules.

10. The computer-implemented method of claim 9, further comprising:
providing the cross channel content based on parental controls associated with the customer premises network.

11. The computer-implemented method of claim 1, wherein determining the cross channel content further comprises:
identifying the elements in the first video program; and
searching for the cross channel content based on the identified elements in the first video program.

12. The computer-implemented method of claim 11, further comprising:
searching for the cross channel content from a database external to a video service provider system.

13. The computer-implemented method of claim 1, further comprising:
linking the integrated whole via one or more of access, control or display of the first video program at the video service device with corresponding access, control or display of supplemental content at the personal device.

14. A device comprising:
a memory to store a plurality of instructions; and
a processor configured to execute instructions in the memory to:
receive a request for cross channel content associated with a user account at a video service provider from a personal device that accesses other content from another network via another communication channel, wherein the personal device is associated with the user account and the other content includes content provided externally from video content provided by the video service provider;
identify a first device associated with a customer premises network, wherein the first device is a separate device from the personal device;
identify a first video program displayed by the first device;
determine cross channel content based on the video content and the first video program;
identify preferences for receipt of cross channel content associated with the user account, wherein the cross channel content is based on the video content from the customer premises network and the other content from the other communication channel, wherein the cross channel content is provided from the video service provider to the personal device;
determine the cross channel content based on analysis of elements of the first video program received at the first device, the other content, and the preferences associated with the user account;
synchronize the cross channel content with the first video program;
integrate delivery of the cross channel content and the first video program to form integrated content; and
provide the integrated content as an integrated whole across the personal device coordinated with the first device.

15. The device of claim 14, wherein, when receiving the request for cross channel content, the processor is further configured to:
receive the request based on Internet browsing activity associated with the personal device.

16. The device of claim 14, wherein, when providing the integrated content, the processor is further configured to:
provide at least one of reviews, comments or ratings associated with the first video program.

17. The device of claim 14, wherein, when providing the integrated content, the processor is further configured to:
provide at least one of an audio program or a second video program that is associated with the first video program.

18. The device of claim 14, wherein, when synchronizing the cross channel content with the first video program, the processor is further configured to:
synchronize supplemental content with an element in the first video program.

19. The device of claim 14, wherein the processor is further configured to:
receive a request for a change to a video service;
identify at least one device from the personal device or the first device that a user associated with the user account is currently using; and
provide a message regarding a response to the request for the change to the video service to the at least one device that the user is currently using.

20. A non-transitory computer-readable medium including instructions to be executed by a processor, the instructions including one or more instructions, which when executed by the processor, for causing the processor to:
receive a request for cross channel content associated with a user account at a video service provider from a personal device that accesses other content from another network via another communication channel, wherein the personal device is associated with the user account and the other content includes content provided externally from video content provided by the video service provider;
identify a video service device associated with a customer premises network and the user account that receives a first video program from the video service provider;
identify the other content from another network via another communication channel accessed by the personal device;
identify preferences for receipt of cross channel content associated with the user account, wherein the cross channel content is based on the video content from the customer premises network and the other content from the other communication channel, wherein the cross channel content is provided from the video service provider to the personal device;

determine the cross channel content based on analysis of elements of the first video program received at the video service device, the other content and the preferences associated with the user account;

integrate delivery of the cross channel content and the personal device content to form integrated content; and provide the integrated content as an integrated whole across the personal device coordinated with the video service device, wherein the integrated content enables access via the personal device to content associated with the video service provider.

* * * * *